Feb. 6, 1962 W. E. BURNS 3,019,664
FRICTION GEAR TYPE VARIABLE SPEED TRANSMISSION
Filed May 12, 1960 2 Sheets-Sheet 1
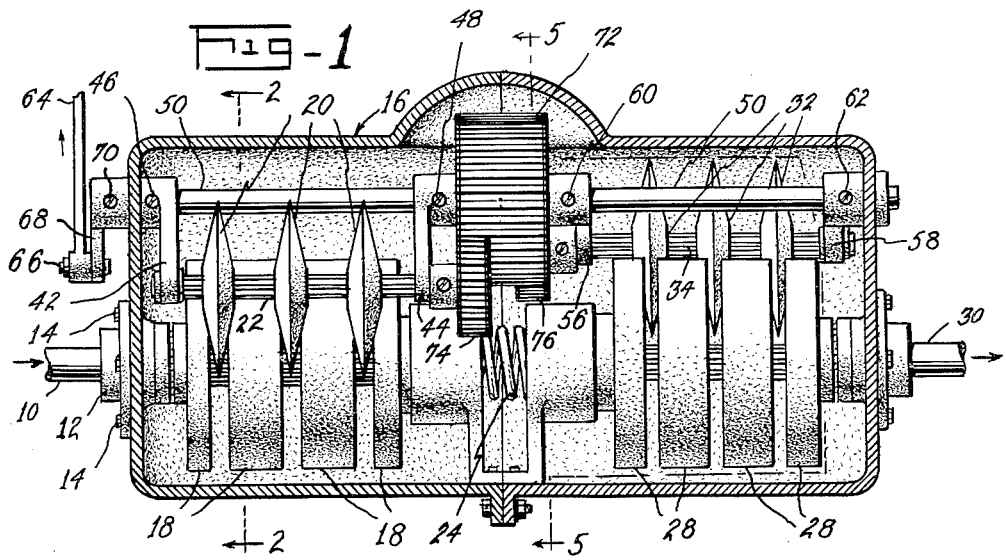
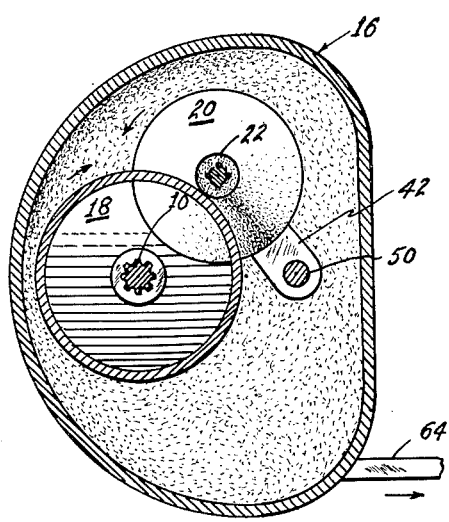
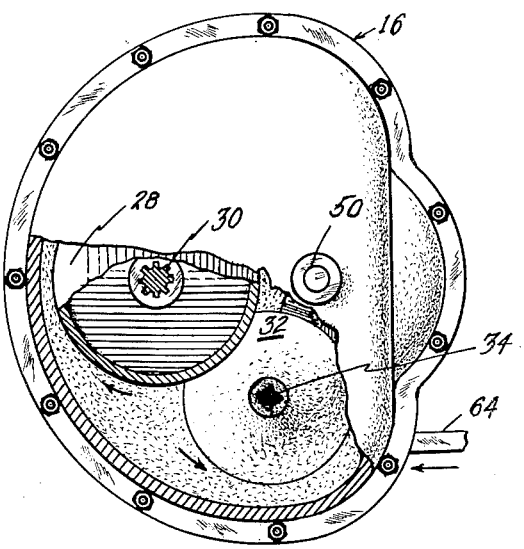
INVENTOR
WILLIAM E. BURNS
BY William V. Ebs
his ATTORNEY

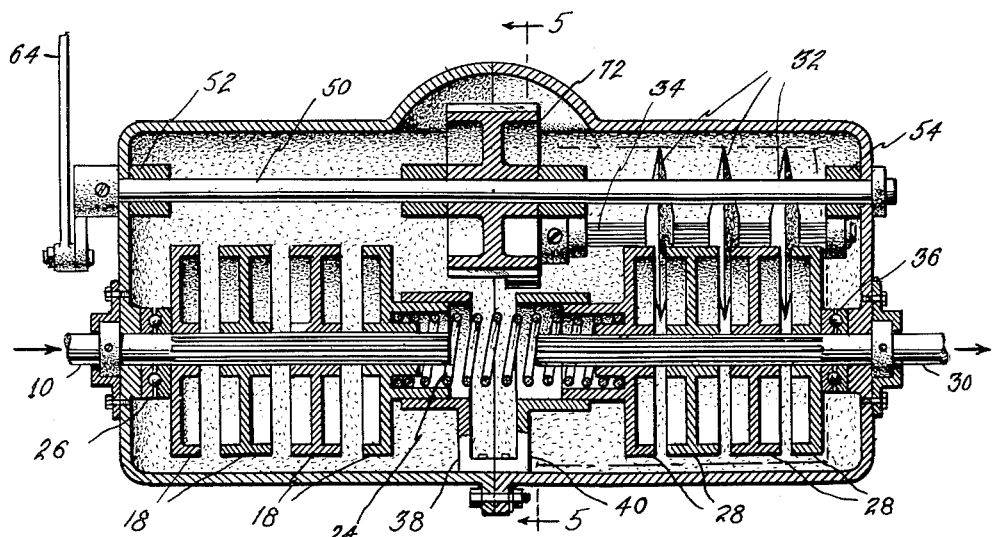
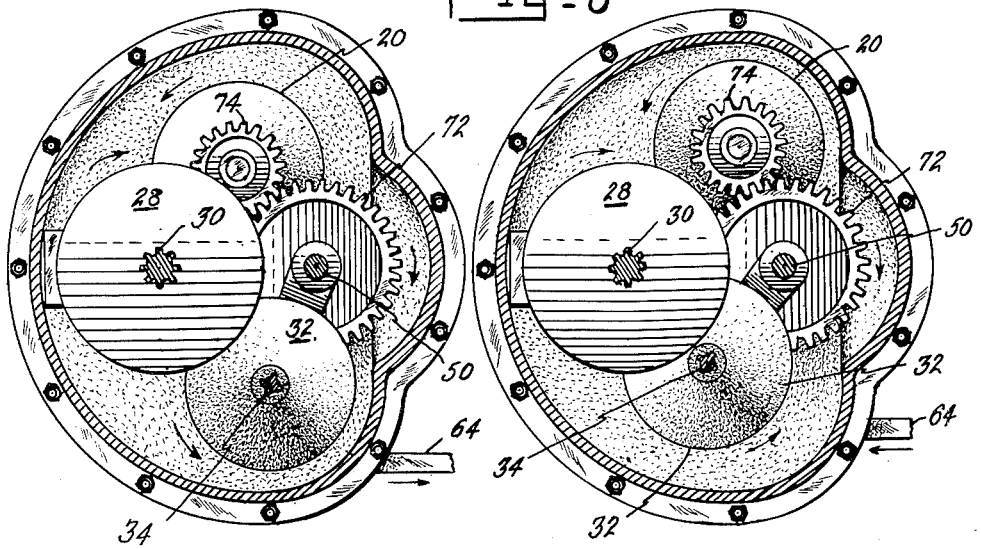

United States Patent Office 3,019,664
Patented Feb. 6, 1962

3,019,664
FRICTION GEAR TYPE VARIABLE SPEED
TRANSMISSION
William E. Burns, Denville, N.J., assignor to Curtiss-
Wright Corporation, a corporation of Delaware
Filed May 12, 1960, Ser. No. 28,620
9 Claims. (Cl. 74—199)

My invention relates to power transmissions of the type wherein the speed of an output shaft may be varied with respect to the speed of an input shaft in infinitely small steps. More particularly, the invention relates to such type of power transmissions in which the relative positions of engaging friction gears determine output speed.

It is well known in variable speed transmissions of the type employing friction gears to provide two sets of such gears or discs as they are commonly called, one of which is rotated by an input shaft and the other of which is geared to the output shaft of the device. One set of friction discs is movable with respect to the other, such that one of the two sets of discs may be engaged at selected radii with the other, such radii of engagement determining the speed of the output shaft as compared to input speed. Biasing means maintain the discs in engagement and provide the requisite force of frictional engagement necessary for the transmission of power through the device.

In the device of the invention four sets of friction discs are provided. One such set of discs is rotationally fixed on the input shaft and another similar set of discs is rotationally secured to the output shaft. One set of adjustable discs is provided to engage the discs on the input shaft and another set of adjustable discs is provided to engage the discs on the output shaft. Suitable means are provided for simultaneously moving the two sets of adjustable discs in opposite directions with respect to the friction discs on the input and output shaft, and it is by means of such simultaneous adjustment that the speed of the output shaft is controlled. A single spring provides the requisite biasing force for all of the engaging discs of the device.

An object of the invention is to provide a variable speed transmission of the friction drive type which provides an extensive speed range in a construction of simple and economical design.

Another object of the invention is to provide a variable speed transmission having relatively movable engageable friction discs wherein the force required to relatively move the discs is a minimum.

Another object of the invention is to provide such a variable speed transmission wherein the force, by means of which the friction discs are maintained in driving engagement, is held substantially constant.

Other objects and advantages of the invention will become apparent during the course of the specification taken in conjunction with the accompanying drawings in which, FIG. 1 is a side view of the device of the invention with the casing cut away to show interior structure, FIG. 2 is a sectional view taken along the line 2—2 of FIG. 1, FIG. 3 is an end view of the device with a portion of the casing broken away to show interior elements, FIG. 4 is a longitudinal vertical sectional view of the device, FIG. 5 is a sectional view taken on the line 5—5 of FIGS. 1 and 4, FIG. 6 is a view similar to FIG. 5 but showing the mechanism in a different position.

Referring to the several views of the drawings, reference character 10 denotes an input shaft which is journalled for rotation in structure 12 secured as at 14 to housing 16. Splined upon shaft 10 are a number of friction discs 18 having peripheral engaging surfaces which contact tapered friction discs 20 splined on shaft 22. The discs 18 and 20, although rotationally fixed on their respective shafts are slidable longitudinally and are squeezed together by the action of spring 24. The spring 24 bears against the most rightward disc 18 and the various discs 18 and 20 are caused to forceably bear against one another. The most leftward disc 18 bears against the bearing 26.

Reference character 28 designates a plurality of friction discs similar to the discs 18. Such discs 28 are splined on the output shaft 30 of the device and have peripheral engaging surfaces in contact with tapered discs 32. The discs 32 are similar to the discs 20 and are splined upon shaft 34. The discs 28 and 32 are also squeezed together by spring 24 which acts against the most leftward disc 28 to cause the engaging friction discs to bear against one another and to cause the most rightward friction disc 28 to bear against the bearing 36. The most rightward disc 18 and the most leftward disc 28 support ends of the shafts 10 and 30 respectively within the device. As shown, the most rightward and most leftward discs 18 and 28 are journalled in structures 38 and 40 respectively, which are secured to the housing 16.

Shaft 22 is rotatably mounted at opposite ends in arms 42 and 44 which arms are fixedly secured at 46 and 48 on a shaft 50. The shaft 50 extends through the device and is rotatably mounted in the housing at 52 and 54. Shaft 34 is rotatably mounted at opposite ends in arms 56 and 58 which are also fixedly secured on the shaft 50 as at 60 and 62. Angular movement may be imparted to the shaft 50 by actuating lever 64 which pivotally connects at 66 with an arm 68 that is fixed to shaft 50 at 70. Angular movement imparted to the shaft 50 by actuating lever 64 results in the tapered discs 20 and 32 being moved relative to the discs 18 and 28 respectively. The arms mounting the shafts 22 and 34, supporting the respective sets of tapered discs, are angularly disposed on shaft 50 so that any movement of the shaft 50 results in discs 20 and 32 being moved in opposite directions, in relation to the discs on the input and output shafts, that is, when the discs 20 are moved inwardly with respect to discs 18, the discs 32 move outwardly with respect to discs 28, and when the discs 20 are moved outwardly with respect to the discs 18 the discs 32 move inwardly with respect to discs 28.

Rotatably mounted on shaft 50 is a gear 72. The gear 72 meshes with the gears 74 and 76 which are affixed on ends of the shafts 22 and 34 respectively. Any rotation of the shaft 22 is transmitted through the gear 74 to gear 72 and thence to gear 76 which rotates shaft 34. The gearing, in addition to providing for the rotation of shaft 34 upon rotation of shaft 22, permits the movement of the shafts 22 and 34 about the axis of shaft 50 upon actuation of lever 64. At such time as shafts 22 and 34 are moved about the axis of shaft 50 the gears 74 and 76, in mesh with gear 72, rotationally adjust the position of gear 72.

In the operation of the device, rotation of input shaft 10 turns the discs 18 which, by reason of their frictional engagement with discs 20, impart rotation to the discs 20 and shaft 22. Shaft 22, acting through the gear train, including gears 74, 72 and 76, in turn imparts rotation to shaft 34 and the discs 32 splined thereon. The discs 32, because of their contacting relationship with the discs 28, cause the discs 28 and, therefore, the shaft 30 to rotate. The speed of the output shaft 30 is subject to variation according to the position of the discs 20 and 32.

As mentioned heretofore, the discs 20 and 32 are movable in opposite directions with respect to the discs 18 and 28 respectively by means of actuating lever 64. When the discs 20 are disposed in extreme inward positions with respect to the discs 18, as shown in FIGS. 1–5, the discs 32 are disposed in their most outward positions with respect to the discs 28. The radii at which the discs 20 contact the discs 18 are small with respect to the radii of the discs 18 and, therefore, discs 20 and shaft 22 rotate at markedly greater speed than input shaft 10. If gears 74 and 76 are of the same diameters, which is a preferable arrangement, shaft 34 is caused to rotate at the same speed as shaft 22. Inasmuch as the discs 32 on shaft 34 are in outwardly disposed positions and the radii at which they contact discs 28 are considerably greater than the radii at which the discs 20 contact the discs 18, the discs 28 and shaft 30 rotate at a speed which is greater than the input speed of shaft 10.

If the actuating lever 64 is moved to position the discs 20 outwardly and the discs 32 inwardly with respect to the discs 18 and 28 respectively, the speed of the output shaft 30 is reduced. The amount by which the output speed is reduced depends upon the extent of the adjustment. With the discs 20 and 32 in positions such that the radii at which they contact the discs 18 and 28 are equal, the output shaft 30 rotates at the speed of input shaft 10. With discs 20 and 32 in extreme outward and inward positions respectively the discs 20 and shaft 22 are rotated much more slowly than when the discs 20 are disposed inwardly. Shaft 34 rotates at the speed of shaft 22 and because the discs 32 are disposed in extreme inward positions with respect to the discs 28 the discs 28 and output shaft 30 are caused to rotate still more slowly. The effect of the second set of discs 32 and 28 is to markedly widen range of speeds between which the speed of the output shaft may be varied.

When the discs 20 are moved inwardly with respect to the discs 18, to change output speed, the discs 18 are spread apart by the wedging action of discs 20. The engaging discs acting upon one another tend to cause the most rightward discs 18 to compress spring 24. However, while the discs 20 are being moved inwardly with respect to discs 18, the discs 32 move outwardly with respect to the discs 28 and in consequence the spring 24 acts to compress the discs 28. When discs 20 are moved outwardly and the discs 32 are moved inwardly with respect to discs 18 and 28 respectively, spring 24 acts to compress discs 18, however, the discs 28 tend to compress the spring. The result, regardless of the way in which the discs are moved, is that no net expansion or contraction of the spring 24 results. The spring maintains a constant length so that the force exerted by it on the rightward and leftward end discs 18 and 28 and by the engaging discs upon one another remains constant, that is to say a frictional force between the engaging discs of the device is constant over the entire speed range of the mechanism.

In the device of the invention the force required to move the tapered discs 28 and 32 inwardly and outwardly with respect to the discs on the input and output shafts is a minimum. The squeezing action of discs 18 and 28, enforced by spring 24, tends to force both sets of tapered discs 20 and 32 outwardly. Resulting moments about the axis of shaft 50, due to such outwardly acting forces on the discs 20 and 32, are equal and, therefore, balance out. In moving the tapered discs inwardly and outwardly only enough force need therefore be applied to actuating lever 64 to overcome the frictional force between the various engaging discs. No force need be exerted in opposition to the spring 24

While only one form of the device incorporating the features of the invention has been shown, it will be apparent that various changes and modifications may be made therein by those skilled in the art without departing from the spirit and scope of the invention as set forth in the appended claims. A gear ratio other than the 1:1 ratio indicated for the gears 74 and 76 might, for example, be used in the device. Obviously the effect of a different ratio would be to shift the speed range of the transmission with respect to input speed. Also, suitable means might be substituted for the spring 24 to vary the force exerted between engaging discs in a desired manner. Torque responsive means might, for example, be utilized to increase the force between the discs as load torque on the output shaft is increased. Numerous other changes and modifications may also be made within the scope of the invention by persons skilled in the art.

I claim:

1. A variable speed transmission comprising an input and an output shaft; a first friction gear mounted on the input shaft for rotation thereby; a second friction gear engageable and rotatable by the said first friction gear; a third friction gear; means operatively connecting the second and third friction gears for rotating the third friction gear upon rotation of the second friction gear; a fourth friction gear engageable and rotatable by the third friction gear, said fouth friction gear being mounted on the output shaft to impart rotation thereto; mechanism for simultaneously moving one gear of one of the two pairs of engaging gears and another gear of the other pair of engaging gears in different directions relative to the input shaft to thereby simultaneously change the radii of engagement in the two pairs of engaging gears in an opposite sense.

2. A variable speed transmission comprising an input and an output shaft; a first set of friction gears mounted on the input shaft for rotation thereby; a second set of friction gears engageable and rotatable by the first set of friction gears, said first and second sets of friction gears constituting one pair of engaging gear sets; a third set of friction gears operatively connected for rotation by the second set of friction gears; a fourth set of friction gears engageable and rotatable by the third set of friction gears, said fourth set of friction gears being mounted on the output shaft to impart rotation thereto, the third and fourth sets of friction gears constituting another pair of engaging gear sets; mechanism for simultaneously moving one set of gears of one of the two pair of engaging gear sets and another set of gears of the other pair of engaging gear sets in different directions relative to the input shaft to thereby simultaneously change the radii of engagement in the two pair of engaging gear sets in an opposite sense.

3. A variable speed transmission as defined in claim 2 wherein the gears of each of the two pair of engaging gear sets movable in different directions are tapered for engagement at different radii, and the other gears are engageable at only a particular predetermined radius.

4. The combination as defined in claim 2 wherein the gears of each of the two pair of engaging gear sets movable in different directions are tapered for engagement at different radii and the other gears are each engageable at only a particular predetermined radius, and including spring means between the two gear sets engaged by the tapered gears to enforce contact between engaging gears and maintain constant the force exerted therebetween.

5. The combination as defined in claim 2 including a gear train of engaging pinions between the second and third set of friction gears.

6. A variable speed transmission comprising an input and an output shaft, a set of friction gears mounted on the input shaft for rotation thereby, one set of tapered friction gears engageable at select radii thereon and rotatable by the friction gears on the input shaft, another set of tapered friction gears operatively connected for rotation by said one set of tapered friction gears, a set of rotatable friction gears mounted on the output shaft for imparting rotation thereto and engageable with said another set of friction gears at select radii on such tapered friction gears for rotation thereby, and mechanism for simultaneously moving the one set of tapered friction gears and the other set of tapered friction gears in different directions with respect to the input shaft to change the radii of engagement on the two sets of tapered gears in the opposite sense whereby rotational speed of the output shaft may be controlled.

7. A variable speed transmission as defined in claim 6 including a spring in compression between the sets of gears on the input and output shaft for enforcing tight frictional contact between engaging gears.

8. The combination as defined in claim 7 including a gear train of engaging pinions between the sets of tapered gears.

9. The combination as defined in claim 8 wherein the mechanism for moving the one set of tapered friction gears and the other set of tapered friction gears in different directions with respect to the input shaft includes a control shaft, two pair of arms fixedly secured on the control shaft with one pair of arms angularly disposed with respect to the other pair of arms, a shaft rotatably mounted in each pair of arms, each rotatably mounted shaft having one set of the tapered friction gears rotationally secured thereon, and means for moving the control shaft to adjust the positions of the tapered friction gears with respect to the friction gears on the input and output shafts.

References Cited in the file of this patent

UNITED STATES PATENTS

| | | |
|---|---|---|
| 1,843,426 | Lee | Feb. 2, 1932 |
| 2,591,753 | Wildhaber | Apr. 8, 1952 |
| 2,841,019 | Beier | July 1, 1958 |